United States Patent
du Plooy et al.

(10) Patent No.: US 12,537,989 B2
(45) Date of Patent: *Jan. 27, 2026

(54) METHOD AND SYSTEM FOR CONTROLLING LIGHTING IN A VIEWING AREA OF A CONTENT-PRESENTATION DEVICE

(71) Applicant: Roku, Inc., San Jose, CA (US)

(72) Inventors: Hugo du Plooy, San Jose, CA (US); Kenny Wu, San Jose, CA (US); Erwin Bellers, Fremont, CA (US); Sunil Ramesh, Cupertino, CA (US); Michael Cutter, Golden, CO (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/918,740

(22) Filed: Oct. 17, 2024

(65) Prior Publication Data
US 2025/0039489 A1    Jan. 30, 2025

Related U.S. Application Data

(63) Continuation of application No. 18/319,024, filed on May 17, 2023, now Pat. No. 12,149,772, which is a (Continued)

(51) Int. Cl.
*H04N 21/41* (2011.01)
*H04N 21/422* (2011.01)
(Continued)

(52) U.S. Cl.
CPC ... *H04N 21/4131* (2013.01); *H04N 21/42203* (2013.01); *H05B 47/165* (2020.01); *H05B 47/19* (2020.01)

(58) Field of Classification Search
None
See application file for complete search history.

(56) References Cited

U.S. PATENT DOCUMENTS

2005/0206788 A1    9/2005    Eves et al.
2007/0075921 A1    4/2007    Yeager et al.
(Continued)

FOREIGN PATENT DOCUMENTS

EP    3409030 B1    3/2020
WO    2017132597 A1    8/2017

OTHER PUBLICATIONS

Philips hue personal wireless lighting, Sync your lights, https://www.philips-hue.com/en-sg/explore-hue/propositions/entertainment/hue-sync, retrieved Nov. 1, 2022*.

*Primary Examiner* — James R Marandi
(74) *Attorney, Agent, or Firm* — McDonnell Boehnen Hulbert & Berghoff LLP

(57) ABSTRACT

In one aspect, a method includes receiving video content comprising a first data portion comprising parameters that control a visual appearance of frames of video content presented by a content-presentation device. The content-presentation device is communicatively coupled to a light unit that is (i) present in a viewing area of the content-presentation device and (ii) configured to provide ambient light in the viewing area. The method also includes extracting, from the received video content, a second data portion, separate from the first data portion, specifying one or more light control parameters that a controller associated with the light unit is configured to interpret as instructions for controlling the light unit. The method also includes transmitting the extracted second data portion to the controller to facilitate the controller controlling the light unit according to the specified one or more light control parameters.

20 Claims, 4 Drawing Sheets

Related U.S. Application Data continuation of application No. 17/981,731, filed on Nov. 7, 2022, now Pat. No. 11,695,980.

(51) Int. Cl.
  *H05B 47/165* (2020.01)
  *H05B 47/19* (2020.01)

(56) References Cited

U.S. PATENT DOCUMENTS

| | | |
|---|---|---|
| 2010/0071535 A1 | 3/2010 | McKinney et al. |
| 2010/0265414 A1 | 10/2010 | Nieuwlands |
| 2018/0295317 A1 | 10/2018 | Tyagi et al. |
| 2020/0213662 A1 | 7/2020 | Wolcott et al. |
| 2021/0235192 A1 | 7/2021 | Healy et al. |

METHOD AND SYSTEM FOR CONTROLLING LIGHTING IN A VIEWING AREA OF A CONTENT-PRESENTATION DEVICE

PRIORITY

This disclosure is a continuation of U.S. patent application Ser. No. 18/319,024 filed May 17, 2023, which is a continuation of U.S. patent application Ser. No. 17/981,731 filed Nov. 7, 2022 (now U.S. Pat. No. 11,695,980 issued Jul. 4, 2023), both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "computing system" means a system that includes at least one computing device. In some instances, a computing system can include one or more other computing systems.

SUMMARY

In one aspect, a method includes receiving video content comprising a first data portion comprising parameters that control a visual appearance of frames of video content presented by a content-presentation device, where the content-presentation device is communicatively coupled to a light unit that is (i) present in a viewing area of the content-presentation device and (ii) configured to provide ambient light in the viewing area. The method also includes extracting, from the received video content, a second data portion, separate from the first data portion, specifying one or more light control parameters that a controller associated with the light unit is configured to interpret as instructions for controlling the light unit. The method also includes transmitting the extracted second data portion to the controller to facilitate the controller controlling the light unit according to the one or more light control parameters specified by the extracted second data portion.

In another aspect, a non-transitory computer-readable storage medium has stored thereon program instructions that, upon execution by a processor, cause performance of a set of operations. The set of operations includes receiving video content comprising a first data portion comprising parameters that control a visual appearance of frames of video content presented by a content-presentation device, where the content-presentation device is communicatively coupled to a light unit that is (i) present in a viewing area of the content-presentation device and (ii) configured to provide ambient light in the viewing area. The set of operations also includes extracting, from the received video content, a second data portion, separate from the first data portion, specifying one or more light control parameters that a controller associated with the light unit is configured to interpret as instructions for controlling the light unit. The set of operations also includes transmitting the extracted second data portion to the controller to facilitate the controller controlling the light unit according to the one or more light control parameters specified by the extracted second data portion.

In another aspect, a computing system includes a processor and a non-transitory computer-readable storage medium, having stored thereon program instructions that, upon execution by the processor, cause performance of a set of operations. The set of operations includes receiving video content comprising a first data portion comprising parameters that control a visual appearance of frames of video content presented by a content-presentation device, where the content-presentation device is communicatively coupled to a light unit that is (i) present in a viewing area of the content-presentation device and (ii) configured to provide ambient light in the viewing area. The set of operations also includes extracting, from the received video content, a second data portion, separate from the first data portion, specifying one or more light control parameters that a controller associated with the light unit is configured to interpret as instructions for controlling the light unit. The set of operations also includes transmitting the extracted second data portion to the controller to facilitate the controller controlling the light unit according to the one or more light control parameters specified by the extracted second data portion.

In another aspect, a method includes receiving video content comprising video parameters that control a visual appearance of frames of video content presented by a content-presentation device, where the content-presentation device is communicatively coupled to a speaker that is present in the viewing area, wherein the speaker comprises a speaker controller and is coupled to a light unit configured to provide ambient light in the viewing area. The method also includes based on at least a portion of the video parameters, determining one or more light control parameters that the speaker controller is configured to interpret as instructions for controlling the light unit. The method also includes transmitting the one or more light control parameters to the speaker controller over an audio channel between the content-presentation device and the speaker, to facilitate the speaker controller controlling the light unit according to the one or more light control parameters.

In another aspect, a non-transitory computer-readable storage medium has stored thereon program instructions that, upon execution by a processor, cause performance of a set of operations. The set of operations includes receiving video content comprising video parameters that control a visual appearance of frames of video content presented by a content-presentation device, where the content-presentation device is communicatively coupled to a speaker that is present in the viewing area, wherein the speaker comprises a speaker controller and is coupled to a light unit configured to provide ambient light in the viewing area. The set of operations also includes based on at least a portion of the video parameters, determining one or more light control parameters that the speaker controller is configured to interpret as instructions for controlling the light unit. The set of operations also includes transmitting the one or more light control parameters to the speaker controller over an audio channel between the content-presentation device and the speaker, to facilitate the speaker controller controlling the light unit according to the one or more light control parameters.

In another aspect, a computing system includes a processor and a non-transitory computer-readable storage medium, having stored thereon program instructions that, upon execution by the processor, cause performance of a set of operations. The set of operations includes receiving video content comprising video parameters that control a visual appearance of frames of video content presented by a content-presentation device, where the content-presentation device is communicatively coupled to a speaker that is present in the viewing area, wherein the speaker comprises a speaker controller and is coupled to a light unit configured to provide ambient light in the viewing area. The set of operations also includes based on at least a portion of the video parameters, determining one or more light control parameters that the speaker controller is configured to interpret as instructions for controlling the light unit. The set of operations also includes transmitting the one or more light control parameters to the speaker controller over an audio channel between the content-presentation device and the speaker, to facilitate the speaker controller controlling the light unit according to the one or more light control parameters.

DETAILED DESCRIPTION

I. Overview

Figure 1:
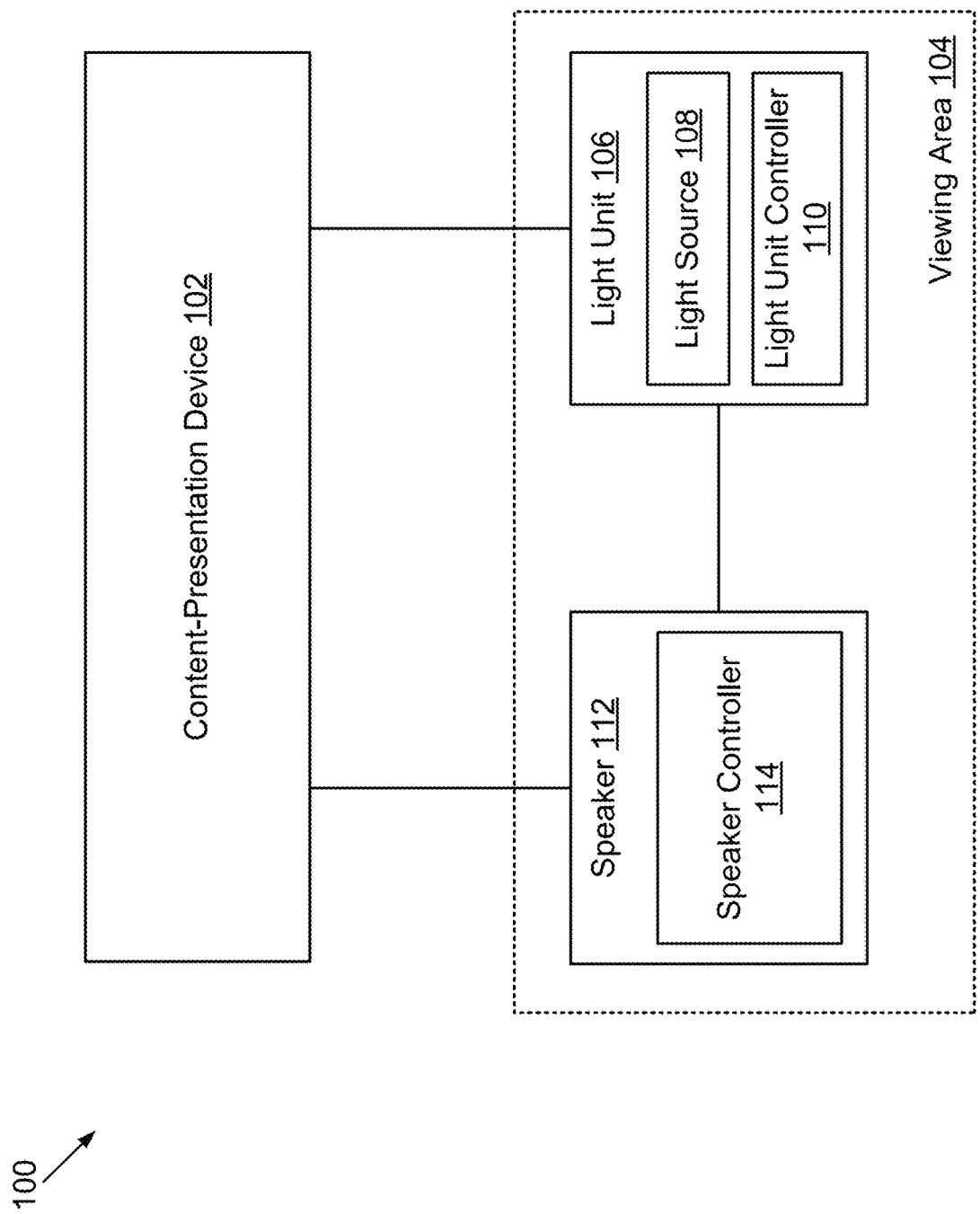
FIG. 1 is a simplified block diagram of an example system in which various described principles can be implemented.

To deliver and present content to end-users, a content provider can transmit the content to one or more content-distribution systems, each of which can in turn transmit the content to one or more respective content-presentation devices, such as television sets and/or set-top boxes, to be output for presentation to respective end-users.

In practice, these content-distribution systems and their means of transmission to content-presentation devices can take various forms. For example, a content-distribution system can be associated with a cable-television provider and can transmit video content to content-presentation devices of end-users who are cable-television subscribers through hybrid fiber/coaxial cable connections. As another example, a content-distribution system can be associated with a video streaming service provider and can transmit video content that is accessible to content-presentation devices of end-users who are subscribers to the provider's streaming service via a software application installed on the television sets and/or set-top boxes.

As such, in various scenarios, a content-distribution system can transmit content to a content-presentation device, which can receive and output the content for presentation to an end-user.

Disclosed herein are methods and corresponding systems for controlling lighting in a viewing area of a content-presentation device, so as to help provide a more immersive viewing experience for the end-user. Within examples, a content-presentation device, such as a television set, can receive video content from a content-distribution system. In practice, the video content received from the content-distribution system can include various video parameters that control or otherwise dictate a visual appearance of the frames of video content when those frames are displayed to the end-user. In some scenarios, such video parameters can include, for instance, color attributes associated with pixels of the frames of video content.

In accordance with the present disclosure, a content provider or other entity can embed other data, separate from the video parameters, that does not control the video appearance of the video content, but rather is dedicated solely or primarily for the purpose of controlling lighting in the viewing area of the content-presentation device (e.g., synchronizing lighting with the video content being displayed by the television set). To facilitate this, such data can specify one or more light control parameters that a controller associated with a light unit present in the viewing area of the content-presentation device is configured to interpret as instructions for controlling the light unit to provide ambient light in a particular way.

As such, upon receipt of the video content, the content-presentation device can extract the light control parameters from the video content and transmit the extracted light control parameters to the controller over a wireless or wired connection with the controller. The controller can then responsively control the light unit according to the light control parameters.

For example, the controller can be part of an external speaker (e.g., a soundbar, portable speaker, or other loudspeaker that is separate from the television set) and can use the light control parameters to cause a light unit integrated with the external speaker to provide ambient light that is synchronized with the video content being displayed on the television set. Additionally or alternatively, no external speaker might be present, and the controller can be a local controller for the light unit, such as a smart lamp located next to the television set in the viewing area. Other examples are possible as well.

The light control parameters can be transmitted to the controller in various ways, such as in ways that advantageously utilize existing communication channels between the content-presentation device and other devices in the viewing area. For example, in the above-described implementation with the speaker, the content-presentation device can transmit the light control parameters over (e.g., embedded in, along with other data) a pre-existing, used or un-used audio channel between the content-presentation device and the speaker. The speaker's controller can then, in turn, itself control operation of the light unit, or forward the light control parameters to a separate controller configured to control operation of the light unit.

There can also be scenarios in which the light control parameters might not be not present as part of the received video content. In such scenarios, the content-presentation device can use the video parameters (e.g., a color histogram of a frame or set of frames of the video content) as a basis for generating light control parameters at the content-presentation device. The content-presentation device can then transmit the generated light control parameters to the light unit in the manner described above or in another manner.

Further, in other scenarios, the content-presentation device might not use any metadata of the received video content to control the light unit. For example, the content-presentation device can be configured to locally analyze the received video content and generate light control instructions to transmit to the light unit.

II. Architecture

A. Example System

FIG. 1 is a simplified block diagram of an example system 100 in which various described principles can be implemented. The system 100 can include a content-presentation device 102.

The system 100 can also include one or more devices present in a viewing area 104 of the content-presentation device 102. In this disclosure, a "viewing area" means a contained environment in which the content-presentation device 102 is located, such as a living room or bedroom in a household. As such, the viewing area 104 can include an area from which the content displayed on the content-presentation device 102 is visible to an end-user, but can also include an area from which the content displayed on the content-presentation device 102 might not be visible to an end-user, such as an area behind the content-presentation device 102 (e.g., between the content-presentation device 102 and a wall).

The one or more devices in the viewing area 104 of the content-presentation device 102 can include a light unit 106. The light unit 106 can include a light source 108 and a light unit controller 110. The light source 108 can take the form of a device configured to provide light into an environment, such as an array of light-emitting diodes (LEDs) or a wirelessly-controllable light bulb. The light unit controller 110 can be configured to control operation of the light unit 106, such as by causing the light source 108 to provide ambient light in the viewing area 104.

The one or more devices in the viewing area 104 of the content-presentation device 102 can also include a speaker 112. The speaker 112 can include a speaker controller 114 configured to control operations of the speaker 112 (e.g., playing music or other audio). The speaker 112 can be or include a smaller-scale, portable speaker, a larger-scale floor speaker, a soundbar, or other type of loudspeaker device.

In some embodiments, the content-presentation device 102 can include a speaker (not shown) as well. For example, the content-presentation device 102 can be a television that has a built-in television speaker. In such embodiments, the speaker 112 can be a physically separate device from the speaker of the content-presentation device 102.

The light unit 106 and the speaker 112 can be physically separate devices (e.g., located on opposite sides of a room in a household), as shown in FIG. 1. Alternatively, the light unit 106 and the speaker 112 can be integrated as part of the same device (e.g., a speaker with built-in, controllable lights). In embodiments where the light unit 106 is integral with the speaker 112, the speaker 112 can include both the light unit controller 110 and the speaker controller 114, or, alternatively, the speaker 112 can include a single controller (e.g., speaker controller 114) that is configured to control operations of the light unit 106 and the speaker 112.

The system 100 can also include one or more connection mechanisms that connect various devices within the system 100. For example, the system 100 can include the connection mechanisms represented by lines connecting the devices of the system 100, as shown in FIG. 1.

In this disclosure, the term "connection mechanism" means a mechanism that connects and facilitates communication between two or more components, devices, systems, or other entities. A connection mechanism can be or include a wired and/or wireless connection. By way of example, a connection mechanism can be or include a cable, system bus, packet-based communication network (e.g., the Internet), or wireless short-range ultra-high frequency radio connection. In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-presentation device 102, the light unit controller 110, and the speaker controller 114 can each take the form of a computing system, an example of which is described below.

B. Example Computing System

Figure 2:
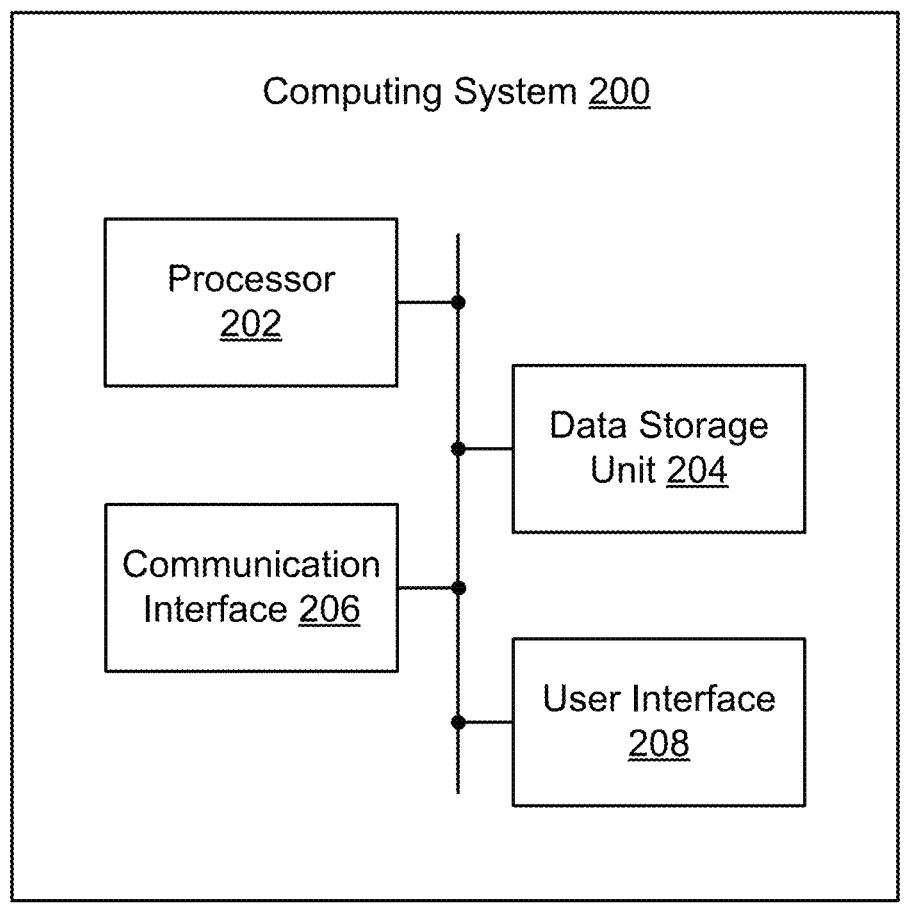
FIG. 2 is a simplified block diagram of an example computing system configured to perform various described operations.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or Wi-Fi interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server device and/or a client device (or perhaps a cluster of servers and/or a cluster of clients) operating in one or more server-client type arrangements, for instance.

As noted above, devices of the system 100 can take the form of a computing system, such as the computing system 200. In some cases, some or all these entities can take the form of a more specific type of computing system. For instance, in the case of the content-presentation device 102, it can take the form of a television set, a set-top box, a television set with an integrated set-top box, a media dongle, a television set with a media dongle connected to it, a desktop computer, a laptop, a tablet, or a mobile phone, among other possibilities.

III. Example Operations

The system 100 and/or components thereof can be configured to perform and/or can perform one or more operations. Examples of these operations and related features will now be described.

The content-presentation device 102 can receive video content (e.g., from a server). The video content can include a first data portion and a second data portion. The first data portion can include video parameters that control a visual appearance of frames of video content presented by the content-presentation device 102. For example, the first data portion can include color attributes of at least one of the frames of the video content. In some cases, the color attributes can be or include a color histogram of a frame or set of frames (e.g., a content segment, such as a scene of a movie) in the video content, which can indicate that a particular color or colors were present in the frame or across the set of frames more than all other colors. The video content can include other information as well. In other cases, the first data portion might not include a color histogram and/or other color attributes that is/are used by the content-presentation device 102 to control lighting.

In this disclosure, the act of the content-presentation device 102 "presenting" video content refers to the content-presentation device 102 providing the video content to be displayed, either by the content-presentation device 102 itself or by another entity. In embodiments where the content-presentation device 102 is a television set, for example, this can take the form of a processor of the content-presentation device 102 (e.g., processor 202) transmitting the video content from an output buffer of the content-presentation device 102 to be displayed by a television screen of the television set. And in embodiments where the content-presentation device 102 is a set-top box that is connected to and physically separate from a television set, this can take the form of a processor of the content-presentation device 102 transmitting the video content from an output buffer of the content-presentation device 102 to the television set, which can in turn receive the video content in an input buffer and ultimately output the video content to be displayed by a television screen. Other examples are possible as well.

The second data portion can specify one or more light control parameters that a controller associated with the light unit 106 is configured to interpret as instructions for controlling the light unit 106. The second data portion can be different from the first data portion. That is, the second data portion might not include any information (e.g., parameters, or the like) that controls what the content-presentation device 102 presents to an end-user (e.g., what is ultimately displayed on a television screen), and can exist as unique data that is transmitted alongside, or encoded into, the video content such that it can later be received and extracted by the content-presentation device 102 for the purpose of controlling lighting in the viewing area 104. In some situations, for example, a content provider can generate the second data portion and either transmit the second data portion alongside the video content, or embed the second data portion in the video content, in order to facilitate control lighting in a desired way.

The one or more light control parameters can take various forms. For example, the one or more light control parameters can include parameters for controlling the color, brightness, or illumination frequency of the ambient light provided by the light unit 106.

As another example, the one or more light control parameters can include information (e.g., mapping data) that correlates each of a plurality of audio volume levels to a respective brightness level. For instance, lower audio volume levels of the video content that the content-presentation device 102 presents can be correlated to lower brightness levels, and higher audio volume levels of the video content that the content-presentation device 102 presents can be correlated to higher brightness levels.

As yet another example, the one or more light control parameters can include information (e.g., mapping data) that correlates each of a plurality of audio volume levels to a respective color spectrum. For instance, lower audio volume levels of the video content that the content-presentation device 102 presents can be correlated to a color spectrum that includes green and/or blue, and higher audio volume levels of the video content that the content-presentation device 102 presents can be correlated to a color spectrum that includes red, yellow, and/or white.

As still another example, the color, brightness, illumination frequency, or lighting information can be time dependent or content segment dependent. That is, the one or more light control parameters can specify various time-points, content segment identifiers (e.g., ad identifiers), or other identifying information indicating when the ambient light should be provided in a particular way. For example, the light control parameters can instruct the controller associated with the light unit 106 to provide ambient light of a particular color, at a particular brightness, at a particular time-point or time-period during presentation of a particular content segment. As another example, the light control parameters can instruct the controller associated with the light unit 106 to not provide (i.e., turn off) ambient light at a particular time-point or time-period during presentation of a particular content segment. In this way, the ambient light can be synchronized with audio content and/or video content in real-time.

Upon receipt of the video content, the content-presentation device 102 can access the video content (e.g., from an input buffer of the content-presentation device 102) and extract the second data portion from the received video content. The input buffer can then transmit the video content to a delay buffer, which then transits the video content to an output buffer after a particular delay time-period (e.g., two to five seconds). The output buffer can receive the video content and can output the video content for presentation.

After extracting the second data portion, the content-presentation device 102 can transmit the extracted second data portion to the controller to facilitate the controller controlling the light unit 106 according to the one or more light control parameters specified by the extracted second data portion. The extracted second data portion can be transmitted directly or indirectly to the controller via one or more of the connection mechanisms discussed above.

In some embodiments, the content-presentation device 102 can transmit the extracted second data portion directly to the light unit 106 (i.e., to the light unit controller 110). That is, the controller to which the content-presentation device 102 transmits the extracted second data portion is the light unit controller 110. This can occur, for instance, in embodiments where the speaker 112 is not present. Alternatively, even if the speaker 112 is present and the light unit 106 is integral with the speaker 112, the content-presentation device 102 can bypass the speaker controller 114 and instead transmit the extracted second data portion directly to a separate controller—namely, the light unit controller 110.

In other embodiments, the speaker 112 can facilitate control of the light unit 106. That is, the controller to which the content-presentation device 102 transmits the extracted second data portion is the speaker controller 114. For example, in embodiments where the light unit 106 is integral with the speaker 112 and does not have a respective controller separate from the speaker controller 114, the speaker controller 114 can be a single controller that is configured to control operation of both the speaker 112 and the light unit 106. To facilitate control of the light unit 106, the speaker controller 114 can have software (e.g., firmware) configured to process/interpret received light control parameters as instructions to control the light unit 106.

As another example, in embodiments where the light unit 106 and the speaker 112 are physically separate devices, as well as in embodiments where the light unit 106 is integral with the speaker 112 and has its own separate dedicated controller—namely, the light unit controller 110—the speaker controller 114 can act as an intermediary device via which the content-presentation device 102 can transmit the extracted second data portion to the light unit controller 110. That is, upon receipt of the extracted second data portion from the content-presentation device 102, the speaker controller 114 can transmit the extracted second data portion to the light unit controller 110.

The content-presentation device 102 can transmit the extracted second data portion to the speaker controller 114 in various ways. For example, the content-presentation device 102 can transmit the extracted second data portion over one or more audio channels between the content-presentation device 102 and the speaker 112. The one or more audio channels can be or include a pre-existing audio channel over which the content-presentation device 102 is transmitting audio content to the speaker 112 for the speaker 112 to output with the video content. Additionally or alternatively, the one or more audio channels can be or include a pre-existing, unused audio channel between the content-presentation device 102 and the speaker 112, separate from an audio channel over which the content-presentation device 102 is transmitting audio content to the speaker 112 for output with the video content.

As another example, the content-presentation device 102 can transmit the extracted second data portion over one or more other communication channels between the content-presentation device 102 and the speaker 112, other than an audio channel between the content-presentation device 102 and the speaker 112, such as a Hypertext Transfer Protocol (HTTP) communication channel or a channel utilizing another type of two-way or one-way communication protocol.

As indicated above, the content-presentation device 102 can transmit the extracted second data portion over a wireless connection or a wired connection between the content-presentation device 102 and the speaker controller 114 or the light unit controller 110. For example, the extracted second data portion can be transmitted over wireless short-range ultra-high frequency radio. As another example, the light unit 106 can be directly connected to the content-presentation device 102 (e.g., via a Universal Serial Bus (USB) port in the content-presentation device 102) and the extracted second data portion can be transmitted over that direct interface.

In some embodiments, the first data portion described above can be used additionally or alternatively to the second data portion as a basis for controlling the light unit 106. In other words, the data that drives the visual appearance of the video content that is ultimately displayed to an end-user can be used to control lighting in the viewing area 104. This can occur in the above-described embodiments where the speaker controller 114 controls operation of the light unit 106, for instance.

In particular, the content-presentation device 102 can receive the video content as discussed above. Based on at least a portion of the video parameters specified by the first data portion, the content-presentation device 102 can then determine one or more light control parameters that the speaker controller 114 is configured to interpret as instructions for controlling the light unit 106, such as one or more of the light control parameters discussed above. The content-presentation device 102 can then transmit the one or more light control parameters to the speaker controller 114 over an audio channel between the content-presentation device 102 and the speaker 112, such as one of the example audio channels discussed above.

In some cases, the act of determining the one or more light control parameters based on at least the portion of the video parameters can involve extracting the first data portion from the video content, detecting, from among the video parameters, color attributes of at least one of the frames of the video content, and then using the detected color attributes to generate one or more light control parameters.

For example, the color attributes can indicate that a particular color dominates a particular frame or set of frames of the video content and thus the content-presentation device 102 can generate a light control parameter that the speaker controller 114 can interpret as an instruction to cause the light unit 106 to provide, at a time-point when the frame or set of frames is/are displayed, ambient light having the particular color.

As a more particular example, a color histogram of a frame or set of frames (e.g., a content segment, such as a scene of a movie) in the video content can indicate that a particular color or colors were present in the frame or across the set of frames more than all other colors, as noted above. From this color histogram, the content-presentation device 102 can generate a light control parameter that the speaker controller 114 can interpret as an instruction to cause the light unit 106 to provide, at a time-point when the frame or set of frames is/are displayed, ambient light having the particular color or colors indicated in the color histogram.

In some embodiments, the content-presentation device 102 can be configured to use machine learning algorithms to distinguish between background visuals and foreground visuals within frames of the video content, and can thus generate light control parameters that cause the light unit 106 to provide ambient light of a particular color or colors present in either the background or foreground of the frames. For example, the content-presentation device 102 can be configured to use machine learning algorithms to distinguish between humans and animals in the foreground of a frame and a sunset in a background of the frame, and can generate light control parameters that cause the light unit 106 to provide ambient light of a particular color that substantially matches or otherwise compliments the colors in the background sunset.

Furthermore, in embodiments where the content-presentation device 102 is a set-top box that is connected to and physically separate from a television set, the content-presentation device 102 can be configured transmit information (e.g., the extracted second data portion, or the one or more light control parameters determined from the first data portion) to the speaker controller 114 or the light unit controller 110 directly over a wireless or wired connection, or can be configured to transmit such information to the television set (e.g., over HDMI) over a wireless or wired connection, which in turn then transmits that information to the speaker controller 114 or the light unit controller 110.

As indicated above, there can be other scenarios in which the light control parameters might not be not present as part of the received video content. In such scenarios, the content-presentation device 102 (or other computing device) can use the video parameters (e.g., a color histogram) as a basis for generating light control parameters at the content-presentation device 102. The content-presentation device 102 (or other computing device) can then transmit the generated light control parameters to the light unit 106 in any manner described above. And in still other scenarios, the content-presentation device 102 might not use any metadata of the received video content to control the light unit 106. For example, the content-presentation device 102 can be configured to locally analyze the received video content (e.g., such as to determine RGB values or patterns) and generate light control instructions to transmit to the light unit 106. Other example scenarios are possible as well.

In some embodiments, the system 100 can also include a microphone and a camera for use in determining and compensating for any possible delay in the system 100. The camera and/or microphone can be coupled to (e.g., mounted on or included as part of) the content-presentation device 102 or an external computing device, such as a smartphone. The camera and the microphone can be coupled to the same device or different devices. For example, the content-presentation device 102 can take the form of a television set and the camera can be mounted on the television set, and the microphone can be a microphone of a smartphone of the end-user. Alternatively, the content-presentation device 102 can include both the camera and the microphone. Other examples are possible as well.

As such, while the light unit 106 is providing the ambient light into the viewing area and while the content-presentation device 102 and/or the speaker 112 is/are presenting the video content, the microphone can be configured to listen to the audio of the video content, and the camera can be configured to monitor the light emitted by the light unit 106. The content-presentation device 102 can thus receive, from the microphone and the camera, audio data representing the audio and image data representing the ambient light, respectively. Together, the audio data and image data can be used by the content-presentation device 102 to determine whether the ambient light lags or leads the audio and determine the delay. Based on the determined delay between the ambient light and the audio (e.g., the ambient light lags the audio by 15 milliseconds), the content-presentation device 102 can perform an action, such as transmitting an instruction to the speaker controller 114 or the light unit controller 110 to facilitate control of the light unit 106.

The act of transmitting the instruction based on the determined delay can take various forms. For example, the act of transmitting the instruction can take the form of embedding an indication of the determined delay in an audio signal transmitted over an audio channel to the speaker controller 114, which the speaker controller 114 is configured to interpret as an instruction to adjust the timing of the emission of the ambient light by the light unit 106. As another example, the content-presentation device 102 itself can adjust the timing with which it sends the extracted or generated light control parameters to the light unit 106 based on the determined delay, such as by sending the light control parameters earlier in time. For example, if the delay is 15 milliseconds, the light control parameters can be sent 15 milliseconds earlier. Other examples are possible as well.

Further, in some scenarios, there can be multiple light units, two or more of which might be experiencing respective delays. For instance, consider a situation in which the content-presentation device 102 determines that there are two lights units and that one is lagging the audio by 30 milliseconds and the other is lagging the audio by 15 milliseconds. In this situation, the content-presentation device 102 can transmit instructions to both light units based on both of the respective delays, such as using the techniques described above with respect to each of the light units.

In some embodiments, an external computing device, different from the content-presentation device 102, can be configured to perform some or all of the operations described herein additionally or alternatively to the content-presentation device 102. The external computing device can take various forms, such as a smart speaker, a smartphone, a smart doorbell, or another type of computing device, any of which could be equipped with an intelligent personal assistant. The external computing device can be communicatively coupled to the light unit 106 in the same way as described above that the content-presentation device 102 is connected to the light unit 106, or by way of a different type of connection.

Light control parameters can be extracted from, or generated based on, video content or other types of information received by the external computing device, upon which the external computing device can transmit the light control parameters to the light unit 106. For example, in response to a smart speaker or other smart home device detecting an emergency situation, the smart speaker can extract or generate an instruction to show a particular color of light and transmit the instruction to the light unit 106. As another example, in response to a smart doorbell detecting that a person is at the end-user's front door, the smart doorbell can extract or generate an instruction to show a particular color of light and transmit the instruction to the light unit 106. As yet another example, in response to a smartphone of the end-user detecting an incoming call, the smartphone can extract or generate an instruction to show a particular color of light and transmit the instruction to the light unit 106. Other examples are possible as well.

Figure 3:
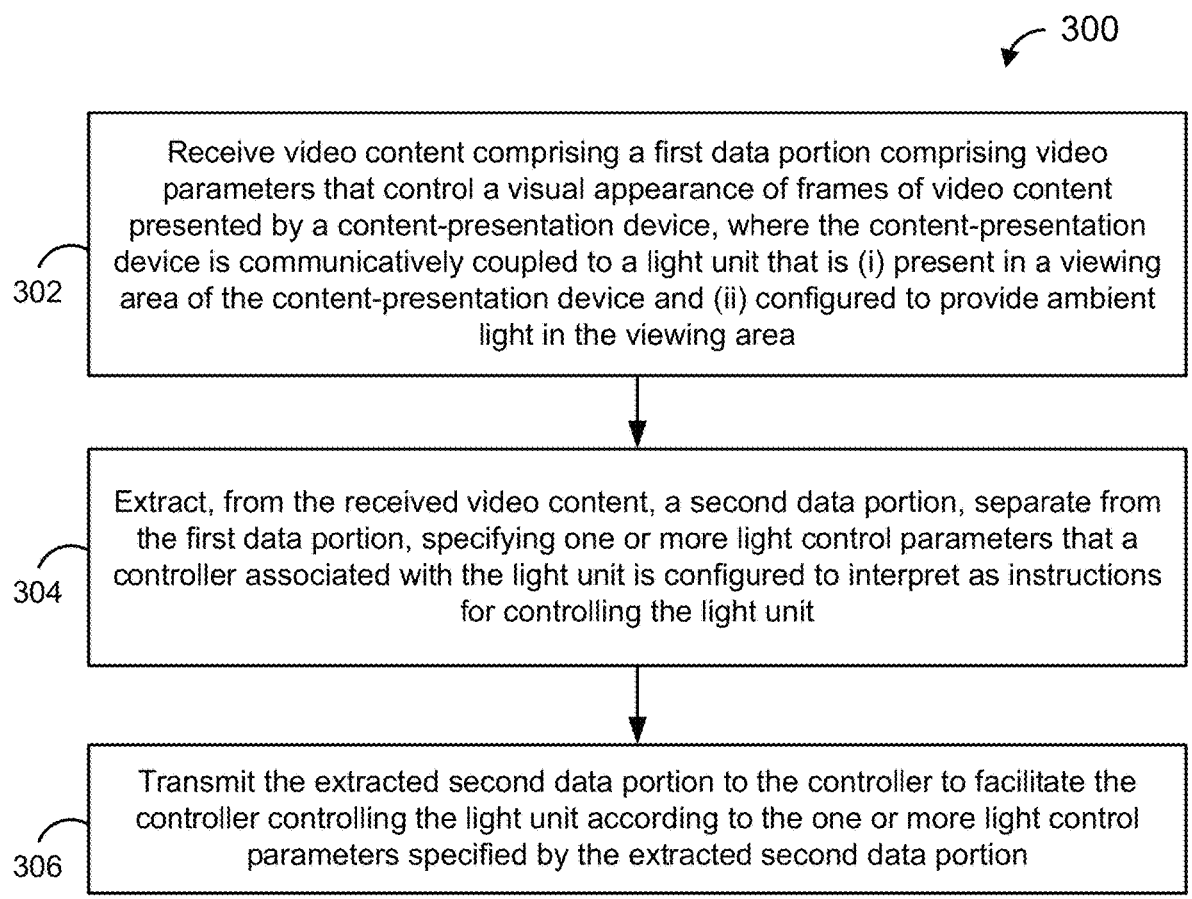
FIG. 3 is a flow chart of an example method.

FIG. 3 is a flow chart of an example method 300. At block 302, the method 300 includes receiving video content comprising a first data portion comprising parameters that control a visual appearance of frames of video content presented by a content-presentation device, where the content-presentation device is communicatively coupled to a light unit that is (i) present in a viewing area of the content-presentation device and (ii) configured to provide ambient light in the viewing area.

At block 304, the method 300 includes extracting, from the received video content, a second data portion, separate from the first data portion, specifying one or more light control parameters that a controller associated with the light unit is configured to interpret as instructions for controlling the light unit.

At block 306, the method 300 includes transmitting the extracted second data portion to the controller to facilitate the controller controlling the light unit according to the one or more light control parameters specified by the extracted second data portion.

In some embodiments, the content-presentation device can be a television set.

In some embodiments, the content-presentation device can be a set-top box, physically separate from and connected to a television set.

In some embodiments, the controller is a light unit controller, the light unit comprises the light unit controller, and the act of transmitting the extracted second data portion to the controller involves transmitting the extracted second data portion directly to the light unit controller. In such embodiments, the content-presentation device can be communicatively coupled to a speaker present in the viewing area, the light unit can be integral with the speaker, and the speaker can include a speaker controller, separate from the light unit controller and configured to control operations of the speaker.

In some embodiments, the content-presentation device can be communicatively coupled to a speaker present in the viewing area, the controller can be a speaker controller, and the speaker can include the speaker controller.

In some embodiments, the light unit can be integral with the speaker, and the speaker controller can be a single controller configured to control operation of both the speaker and the light unit.

In some embodiments, the light unit can be integral with the speaker, and the speaker can also include a light unit controller, separate from the speaker controller. In addition, the speaker controller can be configured to, upon receipt of the extracted second data portion from the content-presentation device, transmit the extracted second data portion to the light unit controller.

In some embodiments, the light unit and the speaker can be physically separate devices, the light unit can include a light unit controller, and the speaker controller can be configured to, upon receipt of the extracted second data portion from the content-presentation device, transmit the extracted second data portion to the light unit controller.

In some embodiments, the content-presentation device can be a television having a television speaker, and the speaker can be a speaker other than the television speaker.

In some embodiments, the act of transmitting the extracted second data portion to the controller can involve comprises transmitting the extracted second data portion to the speaker controller over an audio channel between the content-presentation device and the speaker.

In some embodiments, the act of transmitting the extracted second data portion to the controller can involve transmitting the extracted second data portion to the speaker controller over a communication channel between the content-presentation device and the speaker, other than an audio channel between the content-presentation device and the speaker.

In some embodiments, the one or more light control parameters can include one or more of: color, brightness, or illumination frequency.

In some embodiments, the one or more light control parameters can correlate each of a plurality of audio volume levels to a respective brightness level.

In some embodiments, the one or more light control parameters can correlate each of a plurality of audio volume levels to a respective color spectrum.

Figure 4:
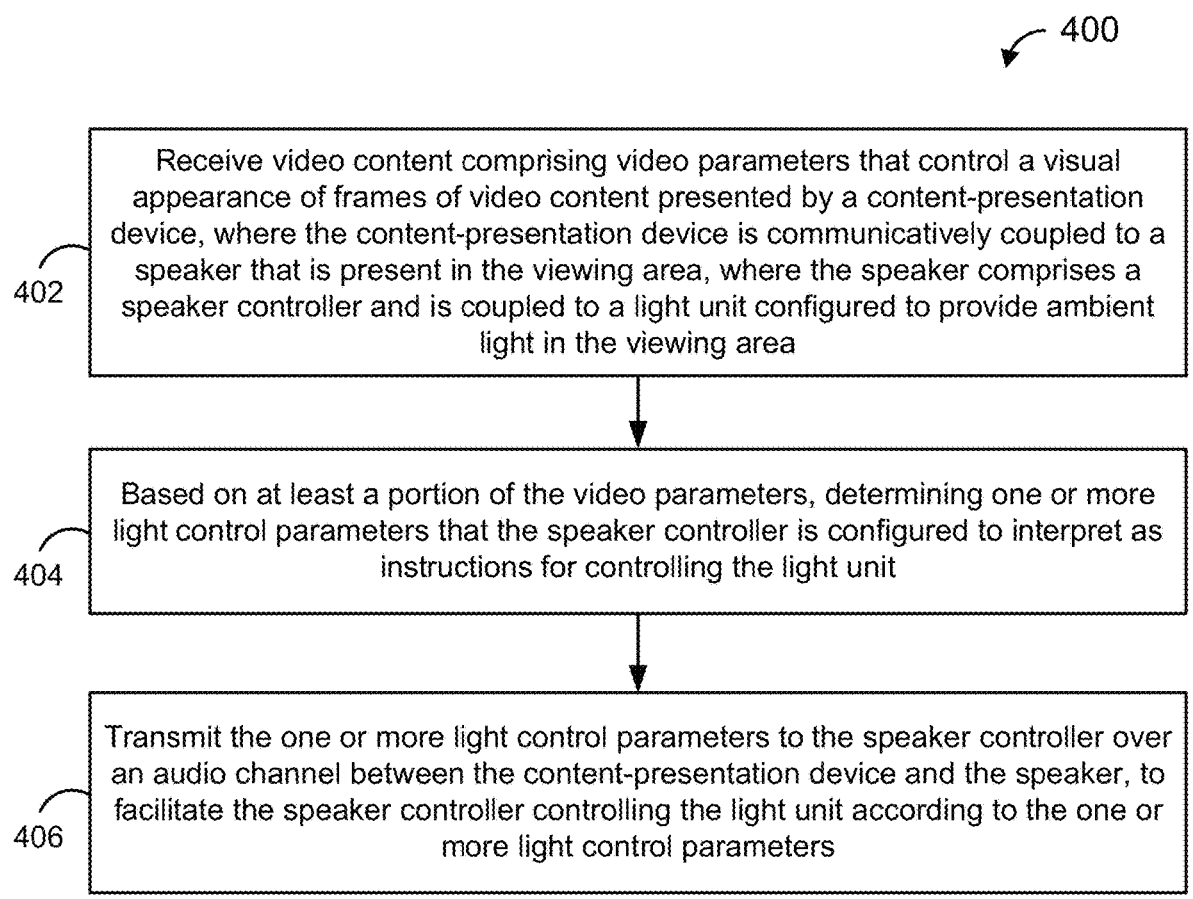
FIG. 4 is a flow chart of another example method.

FIG. 4 is a flow chart of another example method 400. At block 402, the method 400 includes receiving video content comprising video parameters that control a visual appearance of frames of video content presented by a content-presentation device, where the content-presentation device is communicatively coupled to a speaker that is present in the viewing area, where the speaker comprises a speaker controller and is coupled to a light unit configured to provide ambient light in the viewing area.

At block 404, the method 400 includes based on at least a portion of the video parameters, determining one or more light control parameters that the speaker controller is configured to interpret as instructions for controlling the light unit.

At block 406, the method 400 includes transmitting the one or more light control parameters to the speaker controller over an audio channel between the content-presentation device and the speaker, to facilitate the speaker controller controlling the light unit according to the one or more light control parameters.

In some embodiments, the video parameters can include color attributes of at least one of the frames of the video content presented by the content-presentation device.

In some embodiments, the audio channel can be a pre-existing, unused audio channel between the content-presentation device and the speaker, separate from an audio channel over which the content-presentation device is transmitting audio content to the speaker for output with the video content.

In some embodiments, the speaker can include the light unit.

In some embodiments, the light unit and the speaker can be physically separate devices.

In some embodiments, the light unit is directly coupled to a port of the content-presentation device via a wired interface.

In some embodiments, the content-presentation device is communicatively coupled to a camera and a microphone, and the method also includes receiving, via the camera, image data representing the ambient light provided by the light unit, receiving, via the microphone, audio data representing audio from the video content presented by the content-presentation device, based on the image data and the audio data, determining a delay between the audio and the ambient light, and, based on the determined delay, transmitting an instruction to the controller to facilitate the controller controlling the light unit.

IV. Example Variations

Although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method for use in connection with a system comprising a content-presentation device, a light unit, a light unit controller, a speaker, and a speaker controller, wherein the light unit and the speaker are disposed in a viewing area of the content-presentation device, the method comprising:
    receiving video content;
    extracting, from the received video content, data specifying one or more light control parameters that the light unit controller is configured to interpret as instructions for controlling the light unit; and
    transmitting the extracted data to the speaker controller to facilitate the light unit controller controlling the light unit according to the one or more light control parameters specified by the extracted data, wherein the speaker controller is configured to, upon receipt of the extracted data, transmit the extracted data to the light unit controller, wherein transmitting the extracted data to the speaker controller comprises transmitting the extracted data to the speaker controller over an unused audio channel between the content-presentation device and the speaker.

2. The method of claim 1, wherein the content-presentation device is a television set.

3. The method of claim 1, wherein the content-presentation device is a set-top box, physically separate from and connected to a television set.

4. The method of claim 1, wherein:
    the content-presentation device is a television set comprising a television speaker, and
    the speaker is a speaker other than the television speaker.

5. The method of claim 1, wherein the one or more light control parameters comprise one or more of: color, brightness, or illumination frequency.

6. The method of claim 1, wherein the one or more light control parameters correlate each of a plurality of audio volume levels to a respective brightness level.

7. The method of claim 1, wherein the one or more light control parameters correlate each of a plurality of audio volume levels to a respective color spectrum.

8. A non-transitory computer-readable storage medium, having stored thereon program instructions that, upon execution by a processor, cause performance of a set of operations for use in connection with a system comprising a content-presentation device, a light unit, a light unit controller, a speaker, and a speaker controller, wherein the light unit and the speaker are disposed in a viewing area of the content-presentation device, the set of operations comprising:
    receiving video content;
    extracting, from the received video content, data specifying one or more light control parameters that the light unit controller is configured to interpret as instructions for controlling the light unit; and
    transmitting the extracted data to the speaker controller to facilitate the light unit controller controlling the light unit according to the one or more light control parameters specified by the extracted data, wherein the speaker controller is configured to, upon receipt of the extracted data, transmit the extracted data to the light unit controller, wherein transmitting the extracted data to the speaker controller comprises transmitting the extracted data to the speaker controller over an unused audio channel between the content-presentation device and the speaker.

9. The non-transitory computer-readable storage medium of claim 8, wherein the content-presentation device is a television set.

10. The non-transitory computer-readable storage medium of claim 8, wherein the content-presentation device is a set-top box, physically separate from and connected to a television set.

11. The non-transitory computer-readable storage medium of claim 8, wherein:
    the content-presentation device is a television set comprising a television speaker, and
    the speaker is a speaker other than the television speaker.

12. The non-transitory computer-readable storage medium of claim 8, wherein the one or more light control parameters comprise one or more of: color, brightness, or illumination frequency.

13. The non-transitory computer-readable storage medium of claim 8, wherein the one or more light control parameters correlate each of a plurality of audio volume levels to a respective brightness level.

14. The non-transitory computer-readable storage medium of claim 8, wherein the one or more light control parameters correlate each of a plurality of audio volume levels to a respective color spectrum.

15. A computing system comprising:
    a processor; and
    a non-transitory computer-readable storage medium, having stored thereon program instructions that, upon execution by the processor, cause performance of a set of operations for use in connection with a system comprising a content-presentation device, a light unit, a light unit controller, a speaker, and a speaker controller, wherein the light unit and the speaker are disposed in a viewing area of the content-presentation device, the set of operation comprising:
        receiving video content;
        extracting, from the received video content, data specifying one or more light control parameters that the light unit controller is configured to interpret as instructions for controlling the light unit; and
        transmitting the extracted data to the speaker controller to facilitate the light unit controller controlling the light unit according to the one or more light control parameters specified by the extracted data, wherein the speaker controller is configured to, upon receipt of the extracted data, transmit the extracted data to the light unit controller, wherein transmitting the extracted data to the speaker controller comprises transmitting the extracted data to the speaker controller over an unused audio channel between the content-presentation device and the speaker.

16. The computing system of claim 15, wherein the content-presentation device is a television set.

17. The computing system of claim 15, wherein the content-presentation device is a set-top box, physically separate from and connected to a television set.

18. The computing system of claim 15, wherein:
the content-presentation device is a television set comprising a television speaker, and
the speaker is a speaker other than the television speaker.

19. The computing system of claim 15, wherein the one or more light control parameters comprise one or more of: color, brightness, or illumination frequency.

20. The computing system of claim 15, wherein the one or more light control parameters correlate each of a plurality of audio volume levels to a respective brightness level.

\* \* \* \* \*